United States Patent
Ferrero

Patent Number: 5,370,734
Date of Patent: Dec. 6, 1994

[54] DEVICE FOR APPLYING COATINGS STARTING FROM FLOWABLE SUBSTANCES

[75] Inventor: Pietro Ferrero, Waterloo

[73] Assignee: Soremartec S.A., Schoppach-Arlon

[21] Appl. No.: 5,850

[22] Filed: Jan. 19, 1993

[30] Foreign Application Priority Data

Jan. 21, 1992 [CH] Switzerland .............. 00158/92

[51] Int. Cl.⁵ .............................................. A23G 3/20
[52] U.S. Cl. .............................. 118/13; 118/24; 118/300; 99/516; 239/405
[58] Field of Search .................. 118/13, 24, 300; 239/405, 417.3; 99/516

[56] References Cited

U.S. PATENT DOCUMENTS

| | | | |
|---|---|---|---|
| 3,021,779 | 2/1962 | Sollich | 118/24 |
| 3,470,831 | 10/1969 | von Drachenfels | 107/54 |
| 4,369,200 | 1/1983 | Iwao | 426/660 |
| 4,851,263 | 7/1989 | Ishii et al. | 118/53 |
| 5,020,723 | 6/1991 | Crist | 239/405 |
| 5,066,518 | 11/1991 | Klingen | 427/236 |

FOREIGN PATENT DOCUMENTS

| | | | |
|---|---|---|---|
| 463351 | 10/1951 | Australia . | |
| 271567 | 5/1964 | Australia . | |
| 6996087 | 9/1987 | Australia . | |
| 0225624 | 6/1987 | European Pat. Off. . | |
| 0389804 | 10/1990 | European Pat. Off. . | |
| 2312199 | 12/1976 | France . | |
| 1503682 | 3/1978 | United Kingdom | 118/24 |

Primary Examiner—W. Gary Jones
Assistant Examiner—John M. Hoffmann
Attorney, Agent, or Firm—Rothwell, Figg, Ernst & Kurz

[57] ABSTRACT

A coating of creamy material, for example chocolate, is applied by spraying by making the chocolate mass flow to a main nozzle surrounded by an auxiliary nozzle to which air is supplied under pressure. During the spraying, the chocolate mass cools and hardens.

14 Claims, 2 Drawing Sheets

[5,370,734]

DEVICE FOR APPLYING COATINGS STARTING FROM FLOWABLE SUBSTANCES

BACKGROUND OF THE INVENTION

The present invention relates generally to devices for applying coatings starting from flowing or "flowable" substances such as, for example, creamy substances. The invention has been developed with particular concern for its possible use for applying food coatings constituted by flowing food substances such as, for example, melted chocolate, chocolate-flavoured creams, more or less liquid icings, decorative creamy coatings containing chopped products such as hazel-nuts, almonds, coconut, etc.

Many pastry products have coatings of this type. For example, products currently known as cream puffs or profiteroles are constituted essentially by an approximately spherical, hollow body of baked pastry or wafer filled with cream (usually held in a pleated paper cup) the top of which is coated with a creamy decorative coating which is often intended to solidify after application.

The application of this coating industrially and automatically, that is without the need for human intervention, is difficult due to various factors.

In the first place, the quality of the final result is closely dependent on the viscosity of the coating during application.

If the viscosity is too high (that is, if the coating is too dense and pasty) it is difficult to achieve a good distribution over the product which serves as the substrate: in practice, the coating, instead of adhering to the product on which it is deposited, tends to form an independent mass overlying the product itself.

If the viscosity is too low (that is, if the coating is too liquid) the coating tends to distribute itself irregularly over the product forming preferential pouring lines whereby the lower part of the coated product (that within the cup) becomes soiled without the upper part being covered sufficiently.

If the coating used is chocolate or chocolate based there is a further problem due to the fact that, in order to obtain a really satisfactory result from a qualitative point of view, it is necessary for the coating to undergo a proper hardening treatment (which usually occurs in a narrow temperature range around 29° C.) without giving rise to streaks or spots. This means that the chocolate coating being applied must be kept precisely at a temperature around the hardening temperature, which is particularly difficult and expensive to achieve industrially.

SUMMARY OF THE INVENTION

The object of the present invention is to provide an ideal solution to all the problems mentioned above so as to enable coatings to be formed on products made on an industrial scale, by means of flowing substances, for example creamy masses, possibly chocolate, and for these coatings to be hardened properly.

According to the present invention, this object is achieved by virtue of a device having the characteristics described below and set forth in the appended claims.

A further object of the invention is the related process.

BRIEF DESCRIPTION OF THE DRAWINGS

The invention will now be described, purely by way of non-limiting example, with reference to the appended drawings, in which.

DETAILED DESCRIPTION OF THE DRAWINGS

Figure 1:
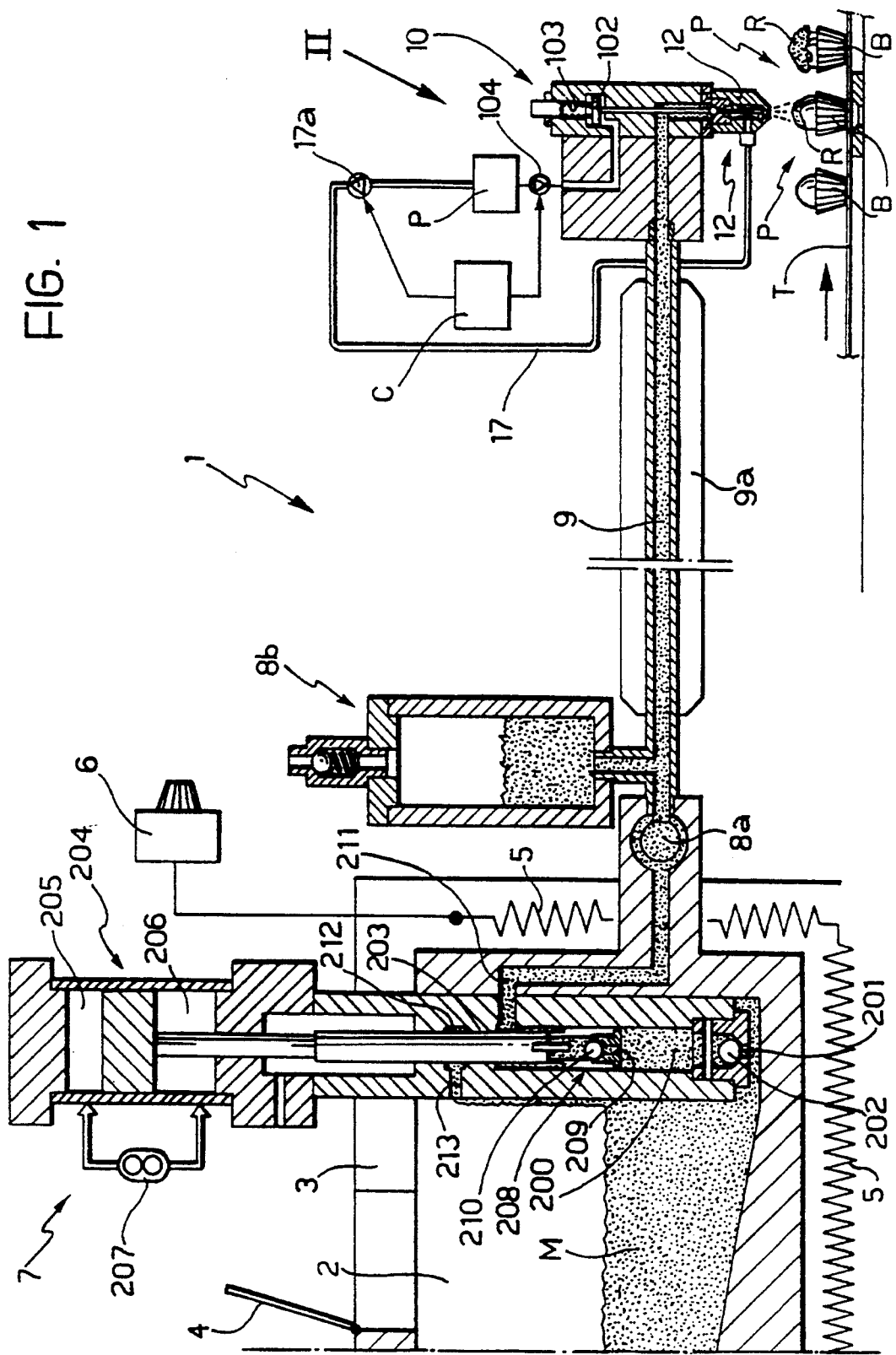
FIG. 1 shows schematically the general structure of a device according to the invention with several parts in section.

In the drawings a device is generally indicated 1 for enabling coatings constituted by flowing (or "flowable", that is, for example, creamy substances or liquids) substances to be applied to products constituted, in the embodiment illustrated here, by food products P of the type currently known as cream puffs or profiteroles.

In practice, the products P are constituted by a generally spherical body, either open or closed, of baked pastry or wafer with a paste-like or creamy filling, possibly with an outer coating of chopped hazelnut or almonds, grated coconut, etc., placed in an appropriate pleated paper cup B.

Commercial products of the type specified above may be made industrially at a high production rate so as to result in a very considerable flow of the products P which advance in rows or lines on conveyors such as endless belts T.

In particular, the invention faces the problem of applying to the upper part (polar part) of the products P a covering cap R made from a substance which is initially flowing, that is creamy or liquid (molten chocolate, chocolate-flavoured cream, or creams with other flavours, icings, creamy decorative coatings containing chopped products, etc).

In the description below, specific reference will be made to the application of a molten chocolate coating R or an equivalent product. In this respect it should be noted that the term "chocolate", as used in the present description is intended to refer primarily to the theological characteristics of the mass constituting the coating. The present invention should not be considered to be in any way limited with regard to the use of the term "chocolate" to solely those substances which may receive this denomination for the purposes of the food, health and hygiene regulations of various countries.

In the case of the application of a coating of this nature, in addition to the general problems which are also found with other coatings (including that of achieving a certain solidification of the coating after application) as stated above, there is the additional problem of ensuring that the coating R hardens correctly without the formation of streaks or other unsightly blemishes.

A container is generally indicated at 2 for receiving the creamy substance M used in the formation of the coatings R.

With reference to the application of a chocolate coating, the container 2 is constituted essentially by a tank the top of which is closed by a covering wall 3. A hatch 4 (which, in installations with a high production capacity, may be replaced by a duct for the continuous or substantially, continuous immission of the substance M into the tank 2) is provided in this cover for the introduction of the substance M. The walls of the tank 2 are thermally insulated from the outside and are at least partly surrounded by heating elements (typically electrical resistors) 5 controlled by a thermostated device 6 which can be selectively regulated.

When a molten-chocolate based coating is used, the thermostat 6 may be regulated so as to keep the chocolate mass M in the tank 2 at a temperature on the order of, for example, 33°–38° C.

In particular, the solution of the invention enables the chocolate mass M within the tank 2 to be kept at a temperature which is normally higher (and generally at least several degrees higher) than the hardening temperature of the mass about 29° C., without this having a harmful effect on the characteristics of the final coating applied and, above all, on the correct hardening thereof. This aspect of the invention is particularly advantageous compared with the prior art solutions in that it avoids the need to exert a very strict and precise thermostatic control on the temperature of the chocolate mass intended for application and for hardening.

The chocolate mass M in the molten state (that is in the creamy state) within the tank 2 is supplied by a suction pump 7, for example a pneumatic pump, the function of which is to transfer the creamy mass under very high pressure (for example 15–25 atmospheres) to its delivery outlet.

Preferably the pump 7 is made in accordance with criteria which will be described more fully below, that is, as a pump which can achieve a certain "release" action on the substance which is pumped by allowing a certain leakage around the pump piston. As will be better understood below, in the specific application to chocolate (and possibly to other coating substances), the adoption of a pump of this type has been shown to be particularly advantageous in that it avoids harmful phenomena arising, from for example, the separation of the creamy product being pumped into different components (solid phase—liquid phase) and/or the seizure of the pump 7.

The delivery of the pump 7 opens through a filter 8a and a pressure stabilizing element 8b, the filter being upstream of the stabilizing element, into a duct 9. The duct 9 is usually constituted by a flexible tube having a heated outer sheath (for example by means of a spiral heating resistor 9a) which maintains the creamy chocolate mass pressurised by the pump 7 at the temperature for transfer to the coating application unit generally indicated at 10.

Figure 2:
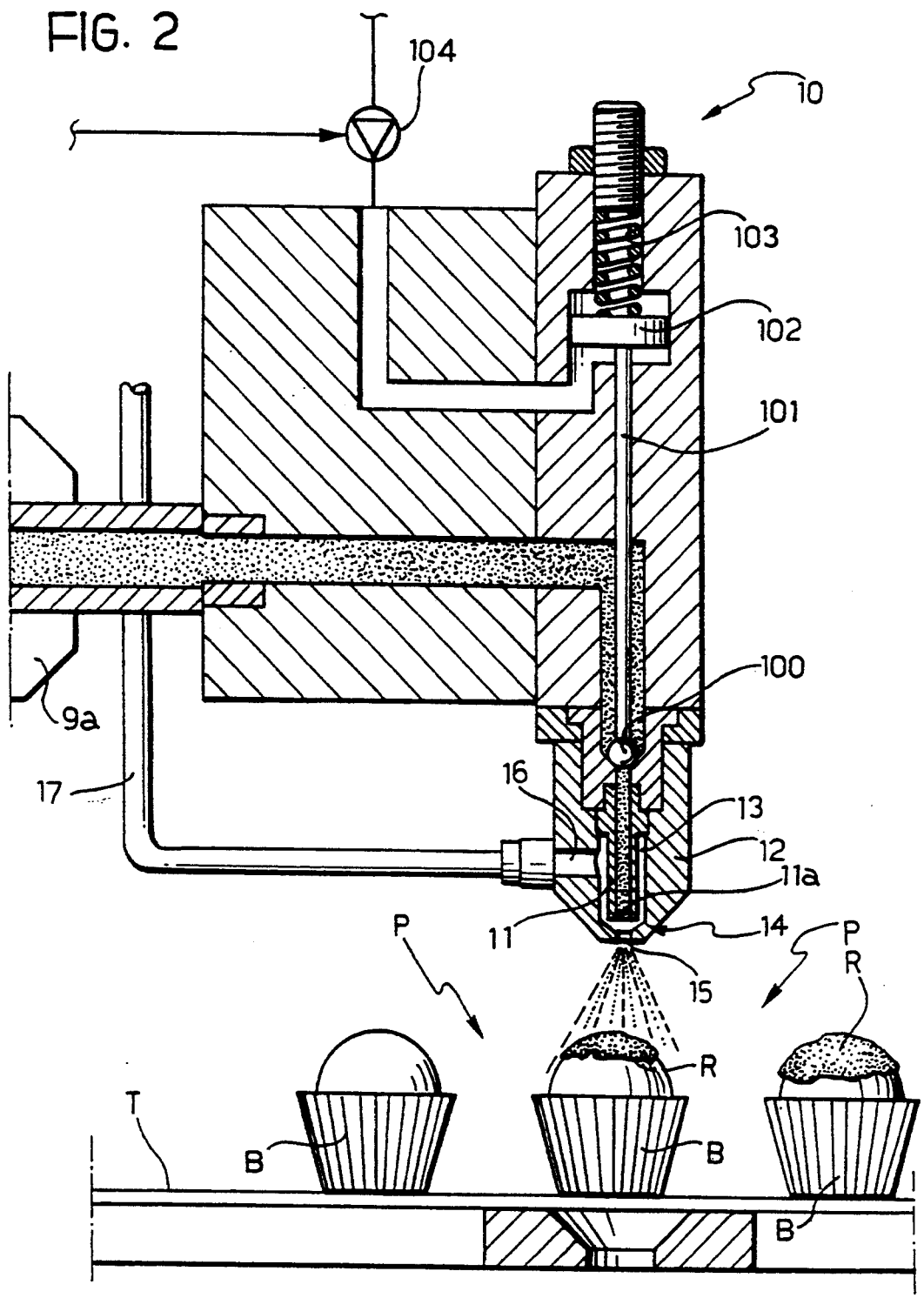
FIG. 2 is a more detailed sectional view of the structure of the element indicated by the arrow II in FIG. 1.

The unit 10 includes (FIG. 2) a nozzle 11 for supplying the creamy substance at a high pressure, the outlet duct of the nozzle being controlled by a ball obturator 100 connected to a rod 101 driven by a pneumatic actuator 102 controlled by a pump P (or by another pressure source) and acting against the reaction force of a spring 103. In practice, by connecting the delivery of the pump P to the actuator 102, which may be made to operate in pulses (that is, for short intervals of opening on the order of 400 milliseconds) by means of a solenoid valve 104, it is possible to open the nozzle 11 for the same intervals to supply the mass M. This supply action may be controlled automatically by a processing unit C (for example a PLC) which controls the solenoid valve 104.

From this point of view, the application unit 10 (and the nozzle 11 in particular) does not differ substantially from similar devices used industrially for the application of heat-fusible adhesives such as adhesives currently known as "hot-melt" adhesives. Indeed, for the purposes of achieving the present invention on an industrial scale, it may be useful to use one of these units for supplying hot-melt adhesives, which already has a pneumatic actuator 102 and related control and drive members, for the device 10.

The nozzle 11 of the device 10 is generally tubular and cylindrical with an end delivery aperture 11a and is surrounded by a further nozzle 12, usually also tubular and cylindrical. The cavity within the nozzle 12 may be seen ideally as divided into an upper annular chamber 13 which surrounds the body of the nozzle 11 and a lower part 14 which faces the delivery aperture 11a of the nozzle 11 and defines a conically-tapered portion 14 which continues into an end duct 15.

The duct 15 is preferably locally adjacent to and, more precisely, located below the delivery aperture 11a of the main nozzle 11.

In the preferred embodiment, the auxiliary nozzle 12 surrounds the nozzle 11 and hence the chamber 13 has a generally annular development around the nozzle 11.

The wall of the nozzle 12 has a through-hole 16 which opens into the chamber 13 and at which terminates a duct 17 for the supply of pressurised gas.

For example, the duct 17 may be connected to the pump source P with the interposition of regulating means (of known type not illustrated) so as to enable a gas flow (typically air) to be produced at a pressure on the order of about 2 atmospheres. Preferably all of this is under the control of a respective solenoid valve 17a which is also regulated by the unit C, preferably in synchronism with the solenoid valve 104. The gas which is supplied through the duct 17 and immitted into the cylindrical chamber 13, and which acts as an expansion volume, passes through the hole 16, expands and proceeds towards the duct 15.

The effect produced by the presence of the additional nozzle 12 on the creamy mass M supplied by the device 10 (and supplied to this at a substantially higher pressure—of about an order of magnitude—with respect to the pressure of the gas sent to the chamber 13) is essentially that of forming a spray by atomization of the mass M leaving the nozzle 11.

In other words, the creamy mass (for example, chocolate) which leaves the lower end of the nozzle 11 is entrained by the pressurised air which flows from the chamber 13 to the duct 15 through the restricted space between the outer surface of the nozzle 11 and the inner surface of the duct 15 itself.

The effect of spraying the coating onto the product P is such as to eliminate all the problems described above in relation to the viscosity of the substance intended to constitute the coating. In practice it suffices to regulate the composition of the substance—in the present case the chocolate mass M—and the original temperature thereof so as to ensure the correct theology during spraying, particularly with regard to obtaining effective breaking up (atomizing). Once this result has been achieved (by known methods: consider for example the theology techniques currently applied industrially and even in the do-it-yourself field for regulating the spraying of spray guns for paints and wall coatings), it is possible to check that the coating R formed on the product P has a substantially uniform thickness the value of which depends mainly on the duration of the spraying, and in practice on the duration of the time interval for the immission of compressed air into the chamber 13.

In order to further improve the spray action, it is preferable for the hole 16 not to extend exactly radially relative to the nozzle 12. On the contrary it is preferred for the hole to be skewed (non-radial) so as to give the air blown into the cylindrical chamber 13 a certain component of movement which is tangential to the nozzle 12. This solution enables the creation within the chamber 13 (and hence in the duct 15) of a helical cyclonic flow which has been shown to be beneficial with regard to the subdivision of the mass M and for the regular spraying thereof onto the products which are to be coated.

The applicant has found that, for spherical products P with a diameter on the order of 1-1.2 cm, it is possible to form a chocolate coating R with a thickness on the order of 2-3 mm with spray intervals (that is intervals of opening of the solenoid valves 104 and 17a) on the order of about 400 milliseconds.

In the case of the application of chocolate-based coatings, the applicant has also noted that the solution according to the invention enables the chocolate to harden entirely satisfactorily in every case. In particular, it can happen that, after spraying thereof, it solidifies in a properly crystallised form in a time interval on the order of about a minute. This means, among other things, that products coated with a coating in accordance with the invention do not generally require further treatment in a cooling tunnel in order to solidify the coating R after application, which treatment is, however, almost essential in the case of coatings applied by the prior art methods.

Although the applicant does not wish to be bound to any specific theory in this respect, he has reason to think that this phenomenon is linked mainly to the heat exchange to which the sprayed chocolate mass (supplied to the device 10 through the duct 9 at a temperature, as seen, on the order of 33°-38° C.) is subjected by the compressed air mass which flows into the chamber 13.

In general, at the moment it flows into the chamber 13, this compressed air is at a temperature which in practice is the same as or slightly higher than (due to the compression) the ambient temperature. In passing into the chamber 13 which acts as an expansion chamber, the compressed air mass is decompressed and thus cools.

During the spraying of the chocolate mass, the air thus has a cooling action on the chocolate mass itself, bringing it to about the hardening temperature due to heat exchange which, exactly due to the fact that it occurs within a finely dispersed mass such as an atomized mass, occurs extremely uniformly without giving rise to thermal gradients which could cause harmful effects such as streaking and the like.

Turning to the detailed illustration of the structure of the pump 7, it may be seen that this includes firstly a main cylinder 200 with an intake opening immersed in the mass M and controlled by a ball obturator 202 under gravity. A piston 203 is movable vertically in the cylinder 200 and is driven by a double-acting actuator unit 204 with two-chambers 205 and 206 alternately connectable (in fully known manner) to a pump member 207 constituted, for example, by a pneumatic pump.

The head of the piston 203, indicated at 208, and situated at the lower end of the piston 203, is traversed by a group of ports 209 which put the upper and lower spaces defined by the head 208 within the cylinder 200 in communication with each other.

The ports 209 are controlled by a further gravity ball obturator 210 so that when the pressure in the lower space in the cylinder 200 is greater than the pressure in the upper space of the cylinder, the pumped mass M passes through the head 208 and may thus flow into the upper part of the cylinder in which is located the delivery opening 211 that is connected to the filter 8a and hence to the duct 9.

Above the cylinder 200 and around the piston 203 is an annular vent chamber 212 communicating with a duct 213 through which the mass M drawn upwardly around the piston 203 may flow back into the tank 3. An important characteristic of the pump 7 is given by the fact that both the head 208 and the piston part 203 intended to cooperate with the chamber 212 have a certain radial clearance (for example one tenth of a millimeter) between them and the respective chambers (that is, in practice, the cylinder 200) in which they slide. All this is to enable a certain amount of the mass M which is being pumped to be drawn, or leak, past the head 208 and the piston part 203 surrounded by the chamber 212. This drawing is the basis of the "release" mechanism for reducing the pressure applied to the mass M and which has been explained above.

In practice, the pump 207 is actuated initially so as to raise the piston 203, making the mass M flow into the lower part of the cylinder 200 through the intake aperture 201 left free by the obturator 202 raised from its seat by the suction action. The direction of operation of the actuator 204 is then reversed so that the piston 203, forced downwards, tends to pressurise the mass M which is beneath the head 208, bringing it to, and maintaining it at, the desired pressure for supply to the duct 9. The piston 203 then tends to fall gradually due to the gradual passage through the ports 209 of a mass corresponding to that taken through the duct 9 of the device 10, and due to the leakage around the head 208 and/or towards the chamber 212. When the piston 203 has fallen beyond a certain limit, the pump 207 acts again on the actuator 204 to raise the piston again to its initial position.

What is claimed is:

1. A device for applying flowable food substances onto food products, the device comprising:

a supply tank for receiving a supply of flowable food substance, the tank having means for maintaining the food substance received therein at a temperature within the range of about 33°-38° C.;

pump means having a cylinder and a piston for drawing food substance from the supply tank and pressurizing the drawn food substance to a pressure of between about 15-25 atmospheres, and for delivering the pressurized drawn food substance to a duct which carries the food substance to an application unit for applying the food substance to a food product, the duct having means for maintaining the temperature of the food substance at a temperature within said range of about 33°-38° C., and the pump unit having release means for reducing the pressure of the food substance carried by said duct to said application unit;

the application unit including:

a main nozzle for receiving from said duct food substance at a temperature within said range of about 33°-38° C. and a pressure within said range of about 15-25 atmospheres, said main nozzle having a delivery aperture for dispensing the food substance; and an auxiliary nozzle having a chamber and a delivery opening, the chamber being in communication with a gas supply means for supplying pressurized gas to said chamber for mixing with the flowing food substance passing out of the delivery aperture of said main nozzle so as to transform the food substance into a spray that is dispensed to create a layer on a food product; and wherein the pressurized gas supply means supplies pressurized gas for mixing with the heated pressurized flowing food substance exiting the main nozzle for forming a food substance spray with the temperature of the spray being less than the temperature of the flowing food substance and just above the food substance's hardening temperature, so as to enable the sprayed food substance coating layer to harden substantially simultaneously with application to the food product.

2. The device of claim 1, wherein said auxiliary nozzle surrounds said main nozzle.

3. The device of claim 1, wherein said chamber is generally annular.

4. The device of claim 1, wherein said chamber converges into said delivery aperture through a conically tapered portion.

5. The device of claim 1, wherein said auxiliary nozzle is arranged so that the said pressurised gas is supplied to said chamber with a component of movement which produces cyclonic flow in said chamber itself.

6. The device of claim 5, wherein said chamber is substantially cylindrical and wherein said pressurised gas is supplied to said chamber in a direction which is generally non-radial of said chamber.

7. The device of claim 1, wherein said gas supply means supply said pressurized gas at a pressure on the order of two atmospheres.

8. The device of claim 1, wherein said pressurized gas is essentially air.

9. The device of claim 1, wherein said gas supply means supply said pressurized gas to said chamber at a temperature substantially corresponding to the ambient temperature.

10. The device of claim 1, wherein said chamber defines an expansion volume for said pressurized gas compared with said gas supply means.

11. The device of claim 1, including heating means for heating said flowable food substance received by said main nozzle at a temperature generally above the ambient temperature.

12. The device of claim 1, wherein said supply means supply said pressurized gas to the chamber at a temperature substantially corresponding to the ambient temperature, whereby the flowable food substance applied by spraying is hardened.

13. The device of claim 1, wherein a filter element and a pressure stabilising member are provided between said pump means and said main nozzle.

14. The device of claim 1 wherein the release means includes at least one port which permits food substance to move past the piston and back into the supply tank so as to reduce the pressure of the food substance carried by said duct to said application unit.

* * * * *